US008817617B2

(12) United States Patent
Hellwig et al.

(10) Patent No.: US 8,817,617 B2
(45) Date of Patent: *Aug. 26, 2014

(54) INDIVIDUAL CODEC PATHWAY IMPAIRMENT INDICATOR FOR USE IN A COMMUNICATION

(75) Inventors: Karl Hellwig, Wonfurt (DE); Dirk Kampmann, Vaals (NL); Alexandru Hlibiciuc, Aachen (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1534 days.

This patent is subject to a terminal disclaimer.

(21) Appl. No.: 12/063,633

(22) PCT Filed: Aug. 16, 2005

(86) PCT No.: PCT/EP2005/008901
§ 371 (c)(1),
(2), (4) Date: Nov. 19, 2009

(87) PCT Pub. No.: WO2007/019872
PCT Pub. Date: Feb. 22, 2007

(65) Prior Publication Data
US 2010/0161325 A1 Jun. 24, 2010

(51) Int. Cl.
*H04J 3/14* (2006.01)
(52) U.S. Cl.
USPC ........... 370/231; 370/254; 370/352; 370/466; 370/329
(58) Field of Classification Search
USPC .......... 370/329, 330, 254, 332, 352; 704/229, 704/200.1, 227, 228
See application file for complete search history.

(56) References Cited

U.S. PATENT DOCUMENTS

| 6,108,560 | A | 8/2000 | Navaro et al. |
| 6,493,355 | B1 * | 12/2002 | Henderson et al. ........... 370/468 |
| 6,567,375 | B2 * | 5/2003 | Balachandran et al. ...... 370/204 |
| 6,600,738 | B1 | 7/2003 | Alperovich et al. |
| 7,436,901 | B2 * | 10/2008 | Tynderfeldt et al. .......... 375/299 |
| 7,447,287 | B1 * | 11/2008 | Parantainen ................... 375/354 |
| 7,606,206 | B2 * | 10/2009 | Yi et al. ........................ 370/335 |
| 2003/0195981 | A1 * | 10/2003 | Graf et al. ..................... 709/238 |
| 2003/0198312 | A1 * | 10/2003 | Budka et al. .................. 375/377 |
| 2004/0002339 | A1 * | 1/2004 | O'Connor ..................... 455/450 |
| 2004/0097240 | A1 * | 5/2004 | Chen et al. .................... 455/450 |
| 2004/0184482 | A1 * | 9/2004 | Gronberg et al. ............. 370/477 |
| 2005/0070256 | A1 * | 3/2005 | Hu ............................. 455/414.1 |
| 2005/0124299 | A1 | 6/2005 | Scribano et al. |

FOREIGN PATENT DOCUMENTS

WO    WO 02/32152 A    4/2002

* cited by examiner

*Primary Examiner* — Rasheed Gidado

(57) ABSTRACT

A system and method control a setup of a connection in a communication network including a set of nodes, such as Mobile Switching Centers (MSCs) and Media Gateways (MGWs). In one example, a speech connection is established between MGWs subject to the control of the MSCs, which can selectively activate or deactivate codecs along the connection. The codecs potentially affect connection quality by differing amounts. A Total Accumulated Impairment (TAI) element is forwarded between the MSCs and updated by the MSCs that include individual partially accumulated impairment values corresponding to the supported codec candidates. Each individual indicator value provides information representative of the expected accumulated impairment along a candidate connection path leading up to, and including, the corresponding codec. By providing information pertaining to the expected accumulated impairment along each candidate connection path, the MSCs can determine an optimum sequence of codecs to minimize the overall connection impairment.

23 Claims, 9 Drawing Sheets

INDIVIDUAL CODEC PATHWAY IMPAIRMENT INDICATOR FOR USE IN A COMMUNICATION

FIELD OF THE INVENTION

The invention generally relates to communication systems and, in particular, to techniques for determining, on a call-by-call basis, the impact and optimal choice of payload coding schemes along a wireless or wireline connection.

BACKGROUND OF THE INVENTION

Communication networks consist of interconnected nodes and can be subdivided into core networks and access networks, the latter providing access to user equipment, for example a wireless access for mobile user equipment to a radio access network. Core networks interconnect access networks and further networks, e.g. other core networks or the Internet. In the Universal Mobile Telecommunications System (UMTS) architecture, an access network can be controlled by a Radio Network Controller (RNC), which is connected to the core network and provides access to the core network, i.e. serves as access node. In the Global System for Mobile Communications (GSM) architecture, the access network is controlled by a Base Station Controller (BSC). The 3G core network is controlled by one or more Mobile Switching Centres (MSCs). These MSCs also influence the decisions in RNC and BSC.

For the transmission on a connection, speech (or other media) is encoded (and subsequently decoded) according to one or more encoding/decoding schemes, also referred to herein as coding schemes and alternatively denoted "codecs". Determination of an optimal codec or set of codecs may be done by means of Codec Negotiation. A coding scheme can transport speech either in a compressed or in a non-compressed mode. In many networks, different coding schemes can be used and different nodes can have different capabilities for handling the coding schemes. Speech transcoders perform the transcoding between different speech coding schemes, i.e. they decode the one scheme into speech (linear PCM or other representation) and then encode the speech by the other scheme. Hence, a transcoder is a device that performs a codec, i.e. it implements a particular coding scheme (in fact a transcoder can implement a number of coding schemes and employ them on per call basis as requested by call/session control applications). Tandem Free Operation (TFO) is a configuration of two transcoders with compatible coding schemes on the compressed voice sides at both ends of a connection, i.e. on the interface to the user equipment. In this case, the transcoding stages can be bypassed and the compressed voice coding is used end to end in the connection (see 3GPP TS 28.062).

Out of Band Transcoder Control (OoBTC) permits speech connections to be established end to end with a common coding scheme, i.e. ideally the same speech coding is used in the whole connection between the access networks. The advantage is that maintaining compressed voice saves core network bandwidth and optimizes speech quality, because transcoding stages, which in principle always introduce distortion, are avoided (see 3GPP TS 23.153).

An International Telecommunication Union (ITU) protocol called Bearer Independent Call Control (BICC) supports out of band signaling procedures, which allow a negotiation of the coding scheme between network nodes. In the ITU-Telecommunication Standardisation Sector (ITU-T) proposal BICC Q. 1901 (ITU, June 2000), coding scheme negotiation is performed from the originating control node in a connection to each subsequent node by including a list of allowed coding schemes in the Application Transport Parameter (APP) parameter in the Initial Address Message (IAM) for the set-up of the connection. Each node checks the list and if it does not support a particular coding type it removes it from the list. The adapted list is passed on with the JAM and any non-supported types are removed as long as the BICC signaling is supported. When the final node, either the terminating node or the last node supporting BICC, is reached, the coding scheme type is selected by the node. This selected coding scheme and the list of remaining, commonly supported codec schemes are returned to the originating node via all intermediate nodes.

In the BICC coding scheme negotiation procedures there are no rules for defining how many transcoder stages are allowed and whether an access network that supports out of band coding scheme negotiation can activate transcoders to keep Transcoder Free Operation (TrFO) between the access node and the rest of the network. The number of transcoding stages in a connection end to end can significantly affect the speech quality. More than three transcoding stages typically cause substantial speech impairment. The number of stages causing a substantial impairment depends on the coding algorithm/scheme and the speech impairment by further entities in the connection.

The coding scheme negotiation procedures may result in transcoders being activated to enable supplementary services or because the bearer technology in a node or network does not support compressed voice. For example, Asynchronous Transfer Mode (ATM) networks allow transmission of either compressed or non-compressed speech, while Synchronous Transfer Mode (STM) networks require non-compressed speech coding, which via bit stealing can include TFO with compressed speech (TFO is not really required in STM). Furthermore, the negotiation should result in the optimum location of the transcoders, which is with today's technologies not always the case. For example, for connections exiting a STM network to ATM, a transcoder should be located at the network edge to save bandwidth in the ATM network by use of a compressed coding scheme.

In many cases, it is necessary to modify the coding scheme in a section of a connection. For example, a connection is often transferred between different access networks due to a handover. Modifications in the core network are disadvantageous, especially if they require increased transmission bandwidth, which will sometimes not be available causing a termination of the connection. The number of transcoder stages in a connection can be increased by a modification, with corresponding quality impairment. Again, an optimum location of transcoders is often not achieved.

These issues will now be described in greater detail with reference to the examples of FIGS. 1-4. FIG. 1 illustrates a speech call originating in Integrated Services Digital Network (ISDN), with pulse code modulation (PCM) A-law coding immediately inside an ISDN-terminal. (A-law is an ITU standard (G.711) for converting analog data into digital form using PCM.) For simplicity, the local exchange that controls the ISDN access is not shown. The TSC shown therein is a transit switching server, which may be collocated with an MSC. The call is routed to a Bearer Independent Core Network (BICN), where Codec Negotiation using Out-of-Band Transcoder Control (OoBTC) is supported, and the call terminates in a mobile terminal on a GSM access. For this example, it is assumed that the BICN and the GSM access support all state-of-the-art GSM Codec Types in TFO. The mobile terminal also supports all GSM Codec Types. The optimal Codec Selection is then to use the best Codec Type supported by the mobile terminal, e.g. the Full Rate—Adaptive Multirate (FR_AMR) codec. The unavoidable transcoder (PCM A-law to FR_AMR) is placed at the interconvection from ISDN to the BICN, i.e. close to the originating side. Optimal voice quality (under these conditions) is achieved with minimal bit rate in the BICN. In this example, the Codec Negotiation assumes that the ISDN access has only used PCM A-law and no other transcoding before. The offered "Supported Codec List" in OoBTC in this case offers PCM A-law as first priority, without any additional information associated with this Codec entry. Other Codec entries follow after this, for example the FR_AMR. The terminating side of the Codec negotiation knows that compression is necessary inside the GSM mobile terminal, but that it is unimportant from a voice quality point of view where to place the transcoder.

FIG. 2 illustrates the same speech call, from ISDN to a GSM mobile, but in this case the mobile is not state-of-the-art and the only Codec Type supported is GSM—Full Rate (GSM_FR) for which, in this case, the GSM radio access does not support TFO. Then "PCM A-law" inside the BICN is optimal for optimal voice quality, although the bit rate is substantially higher. Also in the example of FIG. 2, the Codec Negotiation assumes that the ISDN access has only used PCM A-law but no previous transcoding. Again the offered "Supported Codec List" in OoBTC in this case offers PCM A-law as first priority, without any additional information associated with this codec entry. Other codec entries follow after this, for example the FR_AMR. The terminating node has all necessary information on the terminating radio access and can perform the optimal decision. For example, if voice quality is most important, the terminating radio access determines that FR_AMR is not a good choice.

FIG. 3 illustrates the same scenario, but where bit rate through the BICN is to be minimized (instead of maximizing voice quality). Hence, in the example of FIG. 3, the terminating radio access instead selects FR_AMR for the BICN link and GSM_FR for the GSM access.

FIG. 4 illustrates a scenario wherein AMR is supported at the terminating end, but without TFO support. The terminating side can determine, however, that AMR has a very high quality, much higher than conventional GSM_FR. In this example, the operator puts a high weight on bit rate saving in the core network. Hence, AMR is also selected for the Core network in this case, although, in this case, an additional transcoding stage (i.e. a pair of transcoders) must be activated. In particular, compare FIG. 4 with FIG. 1 discussed above.

Now, considering the four examples together, the example of FIG. 1 achieves the best quality, where only one transcoding from AMR to PCM is performed, because AMR is the optimal codec in this case. The example of FIG. 3 achieves the worst quality, because GSM_FR is substantially worse than AMR and the additional transcoding to AMR for bit rate saving degrades an already compromised voice quality too much (at least for some operators). The example of FIG. 2 has exactly the number of transcoding stages as in the example of FIG. 1, but the voice quality is much lower than in the example of FIG. 1, but better than in the example of FIG. 3. In the example of FIG. 4, a second transcoding stage has been added as compared with the example of FIG. 3. The resulting subjective speech quality is better than in the example of FIG. 3 and even better than in the example of FIG. 2 due to the fact that the use of two AMRs in sequence is still better than the use of GSM_FR once.

These conclusions are derived using otherwise conventional E-Model analysis techniques, which assign an "impairment" factor of "+1" to PCM A-law, "+20" to GSM_FR, and "+5" to AMR (12.2). E-model is a computational model for use in transmission planning. AMR (12.2) represents one particular AMR codec mode. Conventional E-Model techniques assume that these impairments are added along the voice path. For the particular examples of FIGS. 1-4, the following impairment can then be calculated:

Example of FIG. 1: Impairment=1+5=6 transcoding stages: 1

Example of FIG. 2: Impairment=1+20=21 transcoding stages: 1

Example of FIG. 3: Impairment=1+5+1+20=27 transcoding stages: 3

Example of FIG. 4: Impairment=1+5+1+5=12 transcoding stages: 3

Note that, for some communication system operators, it might be acceptable to allow additional speech compression for bit rate saving, but only in the example of FIG. 4, but not in example of FIG. 3. This can be verified by using otherwise conventional Perceptual Evaluation of Speech Quality (PESQ) tools. PESQ sends a carefully selected speech utterance through an established voice path (or a simulated model of it) and records the resulting output signal. PESQ then compares the input utterance with the output signal and calculates the impairment.

In view of the foregoing, it would be highly desirable to provide techniques for allowing network nodes to distinguish between the various scenarios of FIGS. 1-4 to identify, on a call-by-call basis, the optimal selection of codecs to be activated into a connection. However, conventional Codec Negotiation protocols (i.e. TFO, OoBTC, Session Initiation Protocol (SIP) and Session Description Protocol (SDP), Internet Protocol Multimedia Subsystem (IMS), or ISDN User Part (ISUP)), do not provide information on how many transcoding stages are already within the speech path and not how much the speech quality is already degraded. This information is, however, required for the optimal selection, as shown in the examples above.

These and other problems were initially addressed by PCT Patent Application WO 02/32152, entitled "Method and Node for the Control of a Connection in a Communication Network", of Ericsson Telefon AB L M. Briefly, that patent application describes a technique wherein an indicator is forward among nodes of a communication network that identifies, e.g., the number of speech transcoders present along a connection or the accumulated speech impairment along the connection. Nodes controlling the connection use the indicator to determine whether to activate or deactivate speech transcoders along the connection. For example, if the indicator indicates that no transcoders are present in the connection, a transcoder can be advantageously added. On the other hand, if the indicator indicates that one or more transcoders are already present, then preferably no additional transcoders should be added.

In one example described in WO 02/32152, the indicator is a merely flag indicating whether at least one speech transcoder is present in the connection. This allows a simple implementation of the technique utilizing small message size. In another example, the indicator is a counter indicating the number of speech transcoders in the connection. In still other examples, the indicator is a variable indicating the accumulated speech impairment by speech transcoders in the connection, which is compared again one or more numerical thresholds to evaluate optimal transcoder arrangements.

By exploiting the information contained within the indicator, the technique of WO 02/32152 allows for improved selection of transcoders on a call-by-call basis to achieve enhancement of the average quality of connections in a communication network while avoiding deterioration of a connection due to changes in the coding scheme. In other words, nodes can intelligently exploit the information contained within the indicator to make informed decisions regarding modifications to network connections, particularly the activation or deactivation of codecs or other transcoders. Moreover, any impact on the connection in a core network is minimized because many modifications can be kept local in a single node or in an adjacent pair of nodes. Additionally, the techniques are not limited to speech transcoders but are more generally applicable to any entities affecting connection quality. Other examples of such entities include conference devices for connecting conference calls.

Although the technique of WO 02/32152 represents a significant improvement of previous techniques, room for further improvement remains. For example, whereas the indicator of WO 02/32152 can provide an indication of the accumulated (speech) impairment along a connection, it would be beneficial to provide information pertaining to the speech impairment or other impairment arising due to each individual coding scheme of a telecommunication service payload, transcoder or other entity affecting connection quality, so as to permit a more informed decision.

A further complication arises due to the fact that a given speech coding scheme (compression algorithm such as AMR) can be applied on different links with different link characteristics. An AMR compression on a GSM radio link with transmission errors has substantially different overall quality impairments compared to an AMR on a fixed link without errors. Even between radio links the impairment is different: an AMR (7.4 kbit/s) of a GSM Full Rate Channel is substantially more error robust than on a GSM Half Rate Channel. AMR on an UMTS radio channel has yet another impairment. The 3GPP standard TS 26.103 addresses these different radio access characteristics by differentiating the "Codec Type" entry in the Codec List by compression algorithm ("AMR", "EFR") and by radio access "FR_", "HR_", "OHR_", "GSM_" or "UMTS_"). However the Session Description Protocol/Session Initiation Protocol (SDP/SIP) does not take this differentiation into account (e.g. the SDP/SIP maps all AMR Codec Types into a generic "AMR") and is in that respect missing information to provide the basis for a good decision. Even worse, radio impairments also depend heavily on the radio network design and the actual radio conditions. Some of these radio impairments are dynamically varying over time and location, others are semi-static. Moreover, further impairments may occur along the speech path, e.g. conference devices, echo suppressors, noise reduction devices and many more, which need to be known for the optimal Codec Selection.

Accordingly, it would be desirable to provide still further information within a connection impairment indicator so as to allow nodes to make more informed decisions. It is to this end that the present invention is directed.

SUMMARY OF THE INVENTION

In accordance with a method implementation of the invention, a method is provided for controlling the establishment or modification of a connection in a communication network comprising a plurality of nodes, wherein a connection is to be established or modified between selected nodes. At least one of the nodes is adapted to employ one or more coding schemes along the connection, wherein the coding schemes are selected from a plurality of supported coding schemes potentially affecting connection quality by individual amounts. An indicator is sent between the nodes that includes information pertaining to connection quality, wherein the indicator includes a plurality of individual values corresponding to individual coding schemes, each value indicating an expected accumulated impairment associated with a corresponding supported coding scheme. In various examples described herein, the indicator is referred to herein as a Total Accumulated Impairment (TAI) indicator element (TAI element), which is comprised of individual TAI indicator values. The connection may be, for example, a speech, video or multimedia connection.

In one exemplary implementation, the connection comprises a plurality of connection stages, each stage controlled by one or more nodes. A plurality of candidate paths with respect to individual concatenations of coding schemes lead through any preceding stages to a current stage. Each value of the indicator indicates the accumulated impairment associated with the corresponding supported coding scheme of the current stage, as well as the impairment of any coding schemes along one particular candidate path chosen among the plurality of candidate paths leading to the current stage. Preferably, the particular candidate path is the path of least impairment. The accumulated impairment includes impairment due to processing performed by transcoders associated with the coding schemes and impairment due to radio impairment.

Also in the exemplary implementation, the communication network comprises control nodes and payload nodes, which are controlled by the control nodes. The indicator is sent between control nodes, between payload nodes, or between payload and control nodes. The connection is established between payload nodes. Each stage of the connection is adapted to update the values of the indicator based on the supported coding schemes of the corresponding stage. The indicator is initially forwarded from an originating stage to a terminating stage. The terminating stage or any intermediate stage updates the values of the indicator based on impairments due to supported coding schemes of the corresponding stage and then selects the path for use with the connection based on the updated values of the indicator. The updated indicator or a message derived therefrom is returned back through any intermediate connection stages to the originating stage. More precise impairment estimates are calculated step by step in the backward direction by the intermediate stages and by the originating stage according to a finally selected terminating access and a finally selected candidate path. The more precise impairment estimates are passed on from stage to stage such that, within the originating stage, the total accumulated impairment of the selected path is exactly, or at least more precisely, known. In one implementation, the originating stage then sends the indicator with the more precisely calculated accumulated impairments in the forward direction through any intermediate stages to the terminating stage. The node of the originating stage and the nodes of any intermediate connection stages then employ coding schemes in accordance with the selected connection path.

Preferably, the nodes are adapted to send messages containing a list of supported coding schemes. If so, the individual values of the indicator are preferably sent as a dummy entry in the list. The indicator may also be sent in user plane (inband) with or without service payload (at connection modifications after connection setup) or it may be exchanged between call control and payload nodes in both directions, for example at activation of entities in a payload node.

In accordance with a system implementation of the invention, a node is provided for controlling the establishment or modification of a connection in a communication network comprising a plurality of nodes, wherein the node has an interface to at least one other node. The node is adapted to establish or modify at least a portion of the connection and to employ one or more coding schemes along the connection. The coding scheme is selected from a plurality of supported coding schemes potentially affecting connection quality by individual amounts. The node is operative to control establishment of a portion of the connection based in part on an indicator received in a control message, the indicator including information pertaining to connection quality. The indicator includes a plurality of individual values corresponding to individual coding schemes, each value indicating an expected accumulated impairment associated with a corresponding supported coding scheme. The node may be adapted to perform the methods summarized above.

The invention can be implemented as a hardware solution or as a computer program product comprising program code portions for performing the steps of the invention when the computer program product is run on one or more computing devices. The computer program product may be stored on a data carrier in fixed association with or removable from the computing device(s).

BRIEF DESCRIPTION OF THE DRAWINGS

In the following, the invention will be described with reference to exemplary embodiments illustrated in the accompanying figures, in which.

DETAILED DESCRIPTION OF THE PREFERRED EMBODIMENTS

In the following description, for the purposes of explanation and not limitation, specific details are set forth to provide a thorough understanding of the invention. It will be apparent to those skilled in the art that the invention may be practiced in other embodiments that depart from these specific details.

In particular, the functions explained herein below may be implemented using individual hardware circuitry, using a software functioning in conjunction with a programmed microprocessor or general purpose computer, using an application specific integrated circuit (ASIC) and/or using one or more digital signal processors (DSPs).

Figure 1:
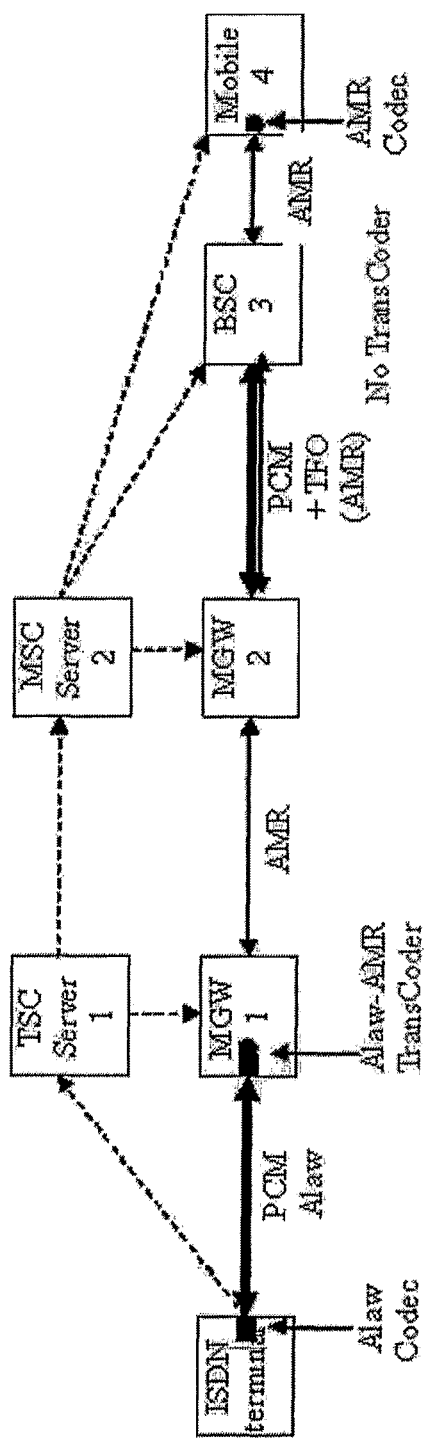
FIG. 1 illustrates an exemplary ISDN-AMR wireless connection having transcoders activated so as to achieve optimal voice quality.
Figure 2:
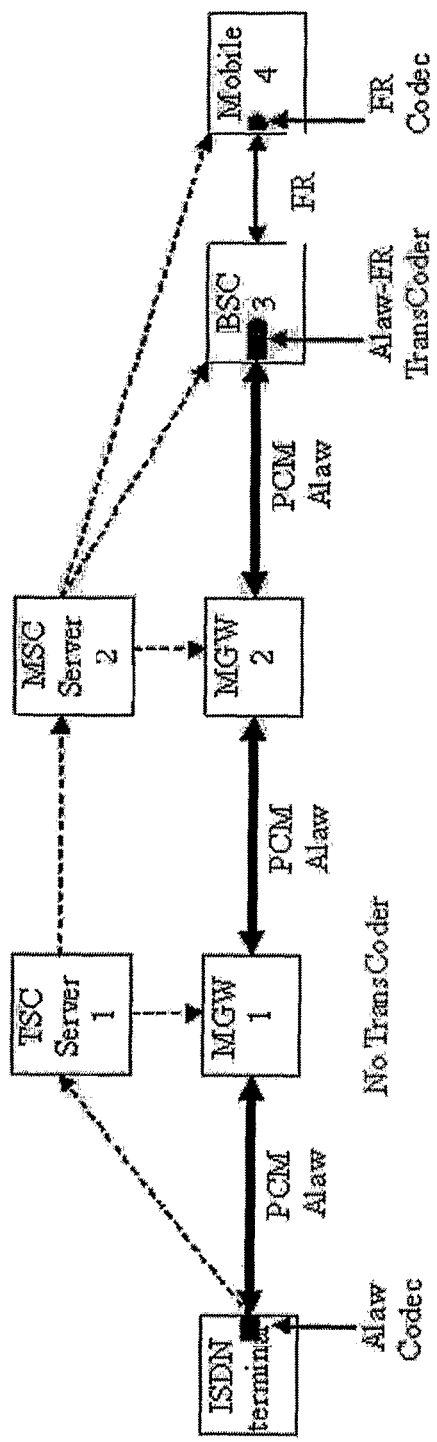
FIG. 2 illustrates an exemplary ISDN-FR wireless connection having transcoders activated so as to achieve optimal voice quality.
Figure 3:
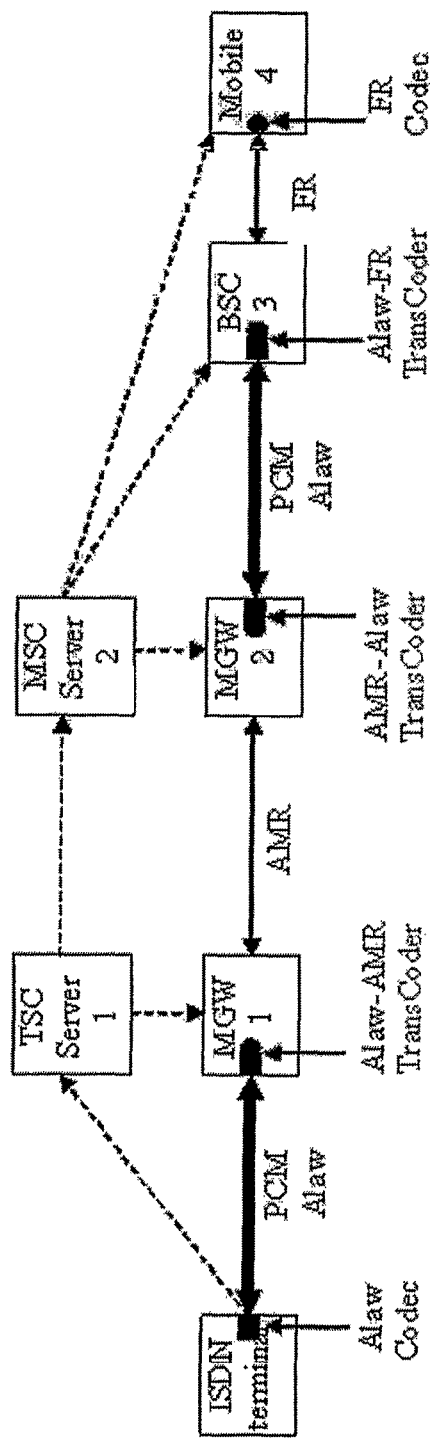
FIG. 3 illustrates an exemplary ISDN-AMR-PCM-FR wireless connection having transcoders activated so as to require minimal bit rate.
Figure 4:
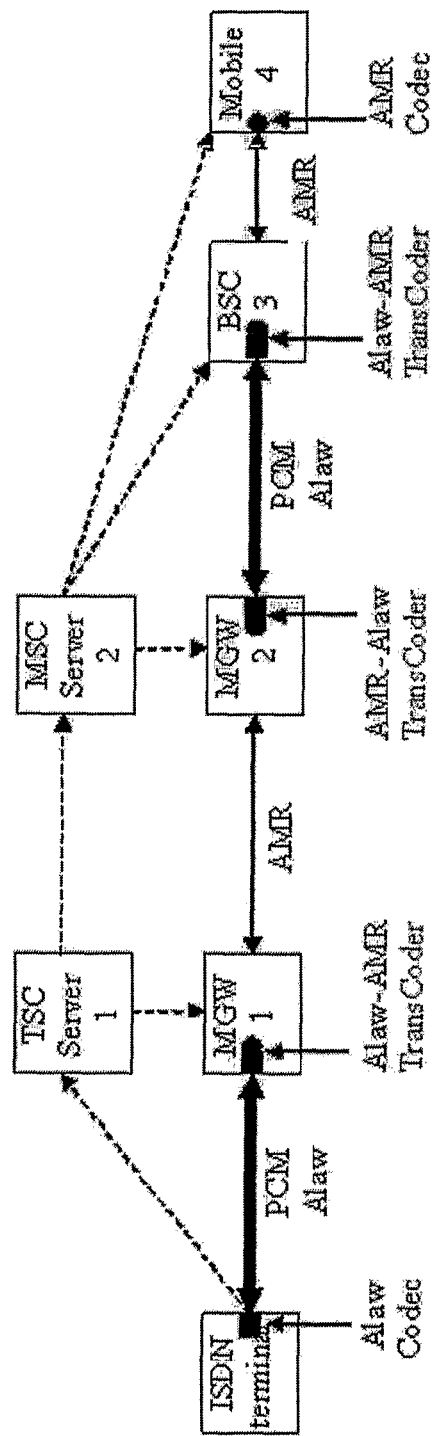
FIG. 4 illustrates an exemplary ISDN-AMR-PCM-AMR wireless connection having transcoders activated so as to require minimal bit rate.
Figure 5:
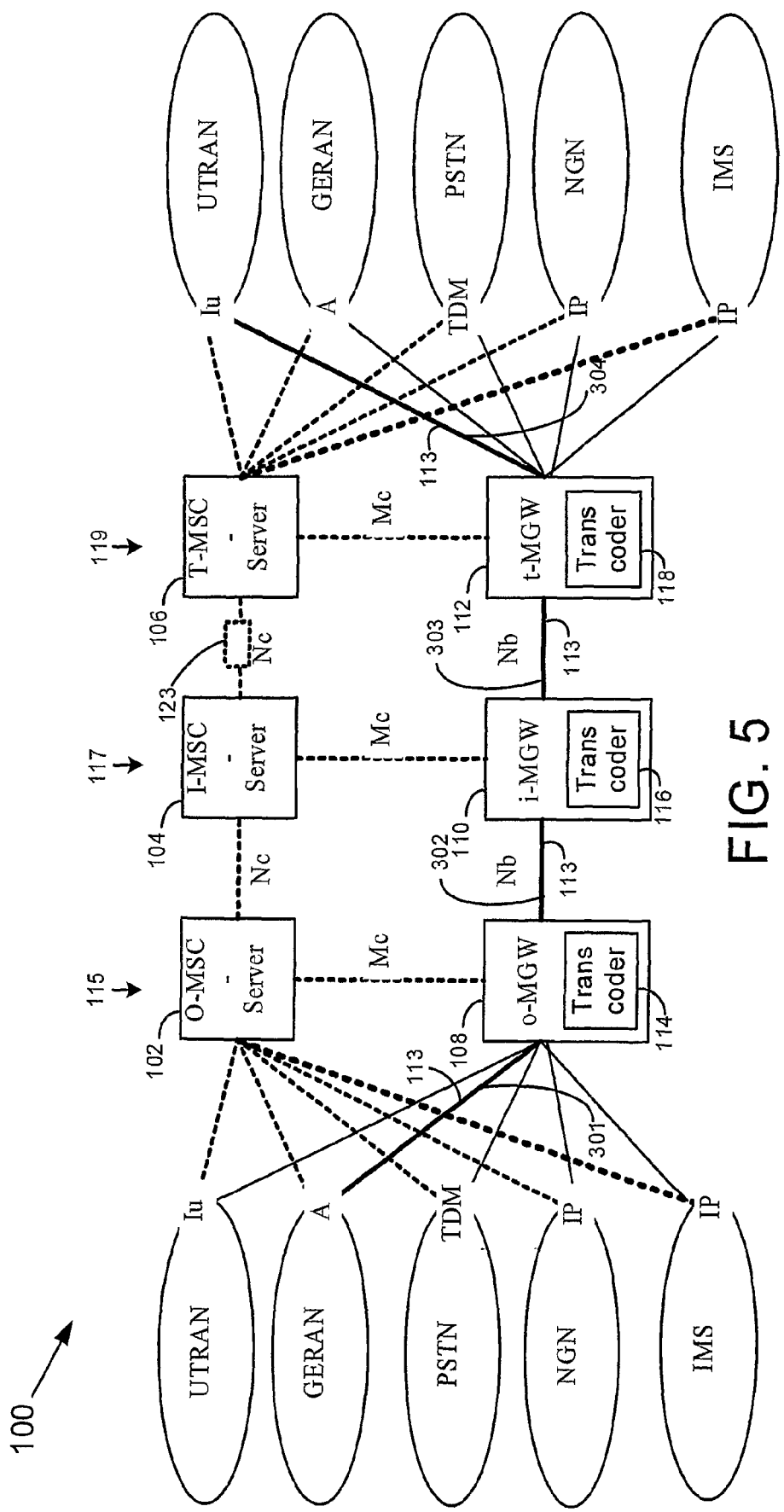
FIG. 5 illustrates an exemplary wireless or wireline communication system in which the invention is implemented.

Turning now to FIGS. 5-9, exemplary embodiments of the invention will now be described. First, with reference to FIG. 5, a communication system of 100 is illustrated, in which the invention is implemented. Communication system 100 may be a combination wireless/wireline system. Communication system 100 includes a set of nodes 102-112 through which signals are routed that pertain to a communication connection, such as an individual speech telephone conversation conducted between mobile telephones. The individual nodes represent individual pieces of telecommunication equipment, such as servers, computer processors, and the like, or systems composed of such components. In the example of FIG. 5, the nodes include a set of MSC servers or control nodes 102-106 through which control signals are routed and a set of MGWs or payload nodes 108-112, through which the actual data corresponding to a connection 113 is routed, such as a speech connection. The exemplary connection includes four portions 301-304. The nodes are shown as being arranged in stages. In particular, an originating stage 115, an intermediate stage 117, and a terminating stage 119 are illustrated. The nodes 102, 108 of the originating stage 115 are associated with the user equipment (not specifically shown) that originates the connection. In the example shown, each stage includes one control node and one payload node. It should be understood, however, that some stages may include multiple control or payload nodes and some control nodes may control payload nodes of multiple stages. Hence, the scope of each stage is somewhat arbitrary. The term stage is used herein primarily for ease in distinguishing among originating, intermediate (if any) and terminating portions of the connection. (Note that, in the figure, O-MSC can also play the role of TSC and GMSC nodes, while I-MSC can be a TSC node only, whereas T-MSC can also be TSC.)

Depending upon the originating user equipment, signals exchanged between the originating nodes and the user equipment may be received, for example, via Iu from a UTRAN system, via A from a GERAN system, via TDM from a PSTN system, via IP from a NGN system or via IP from a IMS system. UTRAN stands for UMTS Terrestrial Radio Access Network. Iu is an abbreviation for the UTRAN interface. GERAN stands for GSM/EDGE radio access network, where EDGE refers to "enhanced data rates for GSM evolution." "A" refers to the interface within the GERAN architecture between an MSC/MGW and a base station subsystem (BSS) of the GERAN. PSTN is the public switched telephone network and TDM refers to time-division multiplexing. IMS is the IP Multimedia Subsystem and NGN refers to Next Generation Networks.

The terminating nodes (106, 112) are associated with the terminating user equipment that receives the connection. Likewise, depending upon the terminating user equipment, signals exchanged between the terminating nodes and the terminating equipment may be via Iu from a UTRAN system, via A from a GERAN system, via TDM from a PSTN system or via IMS from a NGN system. The intermediate nodes (104, 110) represent any additional nodes that may be required between the originating node and the terminating nodes.

In order to establish, process, and eventually terminate a connection, various messages are transmitted between the MSC servers. Exemplary messages include establishment messages, modification messages, and acknowledgement messages relating to the acknowledgement of a modification message or an establishment message. An exemplary message 123 is shown within FIG. 5, which is relayed from a MSC server 104 to MSC server 106. To relay speech for a telephone conversation, one or more transcoders (114-116) are provided within the various MGWs. Although only a single transcoder is illustrated per MGW in FIG. 5, in practice each MGW may support numerous transcoders. Additionally, although not shown, the originating user equipment or the terminating user equipment may also include one or more codecs.

The transcoders compress and decompress speech, as needed, using one or more codecs to enable transmission within the limited bit rate that may be associated with a particular connection, such as exemplary connection 113. Speech is compressed by a transcoder of one stage, then decompressed by a transcoder of another stage, in accordance with a particular codec that both transcoders are capable or employing. Hence, the codecs themselves essentially represent connections between transcoders. (This is illustrated more clearly in FIG. 6, discussed below.) Exemplary codecs include GSM_HR (5.6), GSM_EFR (12.2), AMR (12.2) and AMR (10.2). Others are listed below. Each time a codec is used, the act of coding and then decoding the speech tends to degrade or impair the speech quality. Different codecs impair or degrade speech quality by potentially differing amounts.

Among the information contained within control messages, such as message 123, is information pertaining to the available codecs in a specific node along the connection path. In particular, the message preferably includes a list of "supported codecs," i.e. encoding/decoding schemes capable of being performed between the transcoders of the various MGWs and that may be activated or deactivated during any particular connection. Using information contained within the supported codec list, the MSC servers selectively employs codecs along connection 113. In addition to providing a list of supported codecs, message 123 preferably also includes an information element having individual impairment values, one per supported codec, that indicate the expected accumulated impairment along a candidate connection path 121 associated with the supported codec.

Figure 6:
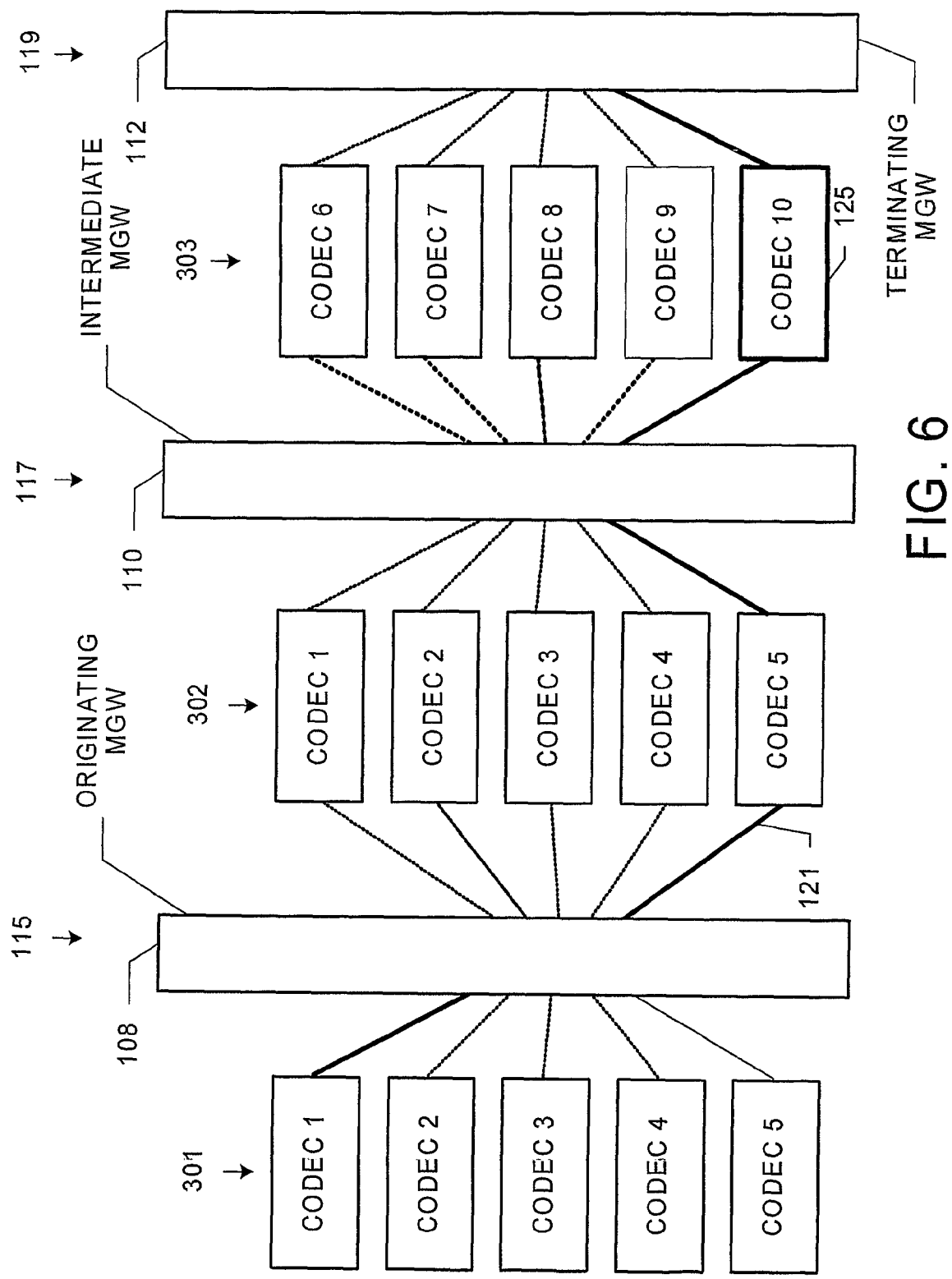
FIG. 6 illustrates candidate pathways associated with the communication system of FIG. 5.

The information element of message 123 will be described in greater detail below. First, however, "candidate connection paths" will be described with reference to FIGS. 6 and 7. FIG. 6 illustrates exemplary codecs 122 that may be used between the MGWs of the three stages of FIG. 5. Each MGW has transcoders (FIG. 7) capable of implementing various codecs, which differ from one another and may also differ from the codecs of the other stages. In the example of FIG. 6, the originating user equipment (not shown) and the originating MGW stage are both capable of supporting Codecs 1-5 and so connection portion 301 is implemented using one of Codecs 1-5. The originating stage and the intermediate stage are both capable of supporting Codecs 1-5 and so connection portion 302 is also implemented using one of Codecs 1-5. The intermediate stage and the terminating stage are both capable of supporting Codecs 6-10 and so connection portion 303 is implemented using one of Codecs 6-10. (Note that the originating stage is not necessarily capable of supporting Codecs 6-10 and the terminating stage is not necessarily capable of supporting Codecs 1-5.)

A large number of possible connection paths may be defined through the codecs from the originating stage through the terminating stage. These are shown in phantom lines. With multiple intermediate stages, a much greater number of possible paths may be present. The originating user equipment and the terminating user equipment also preferably support multiple codecs, hence the connection path from the originating user equipment to the terminating user equipment may have a still greater number of possible connection paths. Ideally, all MGWs support the same list of alternative codecs and allow the MSCs to select the optimal codec end-to-end, depending on the originating and/or terminating terminals.

For any given codec that is supported by the transcoders of a particular stage, one of the possible paths leading up to that stage is considered preferred or optimal based, for example, on the expected accumulated connection impairment along the path leading up to that stage. This preferred or optimal path is referred to herein as a "candidate path," since it represents one viable candidate for the final connection path through the entire sequence of stages (i.e. connection 113 of FIG. 5.) Not all possible paths are considered "candidate paths." Rather, for each supported codec of each stage, only one candidate path is selected from among all of the possible paths leading to that stage. At each stage, a separate impairment value is maintained within message 123 of FIG. 5 for each supported codec of that stage. The impairment value represents at least the total impairment along the candidate paths leading to that stage.

One exemplary candidate path is highlighted in FIG. 6. More specifically, path 121 represents the "candidate path" for codec 125 as supported by the terminating stage 119. An impairment value is stored within message 123 that represents the impairment along path 121. Although not highlighted within the figure, each of the other supported codecs of the terminating stage also has a single candidate path associated therewith. Hence, in this simplified example, there are five candidate paths leading to the terminating stage since the terminating stage supports five different codecs. Separate impairment values are maintained within message 123 for those candidate paths as well. Ultimately, one of these candidate paths leading to the terminating stage is selected as the final connection path. The final connection path is preferably the path with the least overall impairment, calculated based on the various impairment values. Once the final path is selected, the various codecs along that particular path are then used to process the speech signal.

Figure 7:
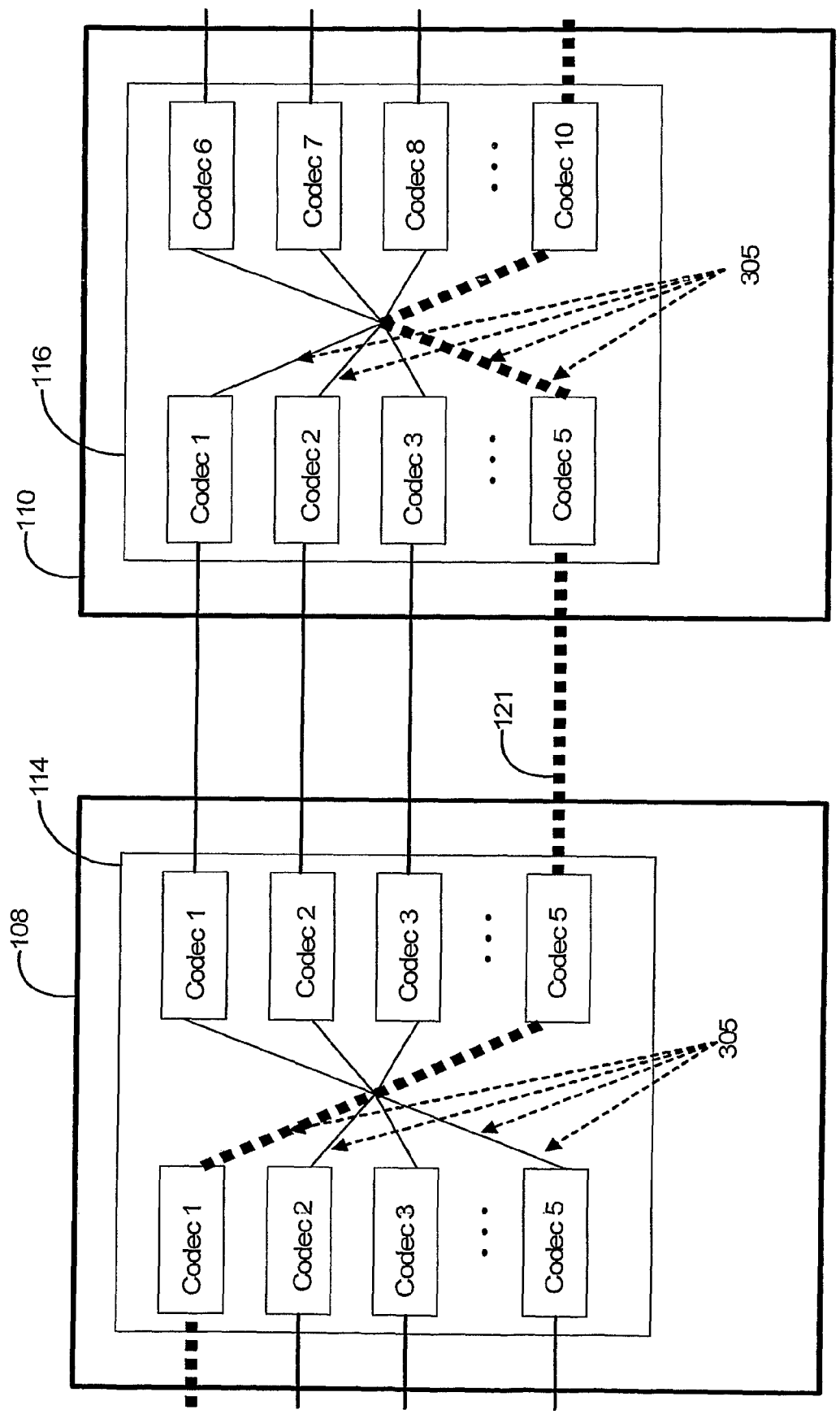
FIG. 7 illustrates the candidate pathways of FIG. 6 with respect to internal components of a pair of exemplary MGWs.

FIG. 7 illustrates how signals are routed through MGWs. Each includes one or more transcoders. With FIG. 7, transcoder 114 of originating MGW 108 is shown and transcoder 114 of originating MGW 108 is shown. Transcoder 114 is capable of implementing Codecs 1-5, and hence Codecs 1-5 are illustrated therein. It should be understood, however, that the Codecs do not represent pieces of equipment within the transcoder but represent coding schemes supported by the transcoder. Transcoder 116 is capable of supporting Codecs 1-5 and Codecs 6-10. As can be seen, transmission between MGWs occurs between like codec portions of the transcoders, i.e. transcoder 114 encodes speech via Codec 5 and transcoder 116 then decodes the speech using Codec 5. Internal payload transmission within the MSGs is illustrated via lines 305 and may be implemented, e.g. via linear PCM. For example, speech decoded via the Codec 1 decoder of transcoder 114 is internally transmitted via PCM to the Codec 5 encoder of transcoder 114 for subsequent transmission to MGW 116. Hence, internal signal routing need not be between like codecs.

One important side aspect of the codec selection procedures is, that each MSC node in the path has only a limited "local" view on its own resources and the incoming list of candidate codecs (paths), but the whole procedures shall find the overall global optimum. Each node in the path, at some point, performs pre-selections to minimize the information flow to the next node, without scarifying the global optimum and without knowing the resources of the following stages.

An intermediate node gets the list of n supported codecs from the preceding node, together with the n associated accumulated impairments for each candidate. This intermediate node knows also all m of its own codecs and the m associated impairments these would introduce, if selected and inserted into the path. The intermediate node can therefore calculate all n*m combinations and all of these n*m total accumulated impairments. Then, in order to keep the outgoing list within a manageable size, it has to select k of these candidates to send these further on to the next node, together with the k associated accumulated impairments, which are now in general bigger than in the incoming list.

Figure 8:
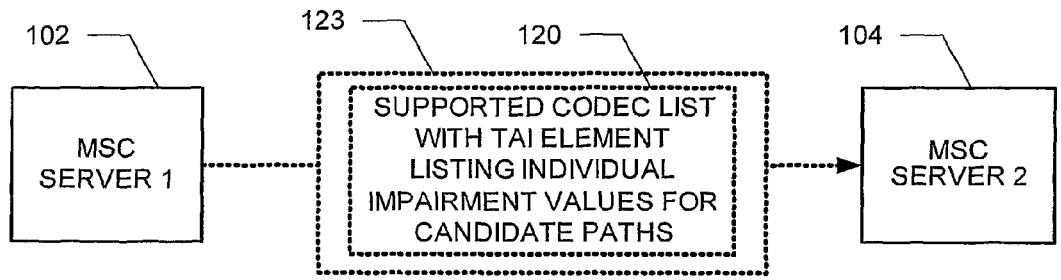
FIG. 8 illustrates an exemplary pair of MSCs of the communication system of FIG. 5 exchanging a supported codec list message having a TAI information element configured in accordance with the invention.
Figure 9:
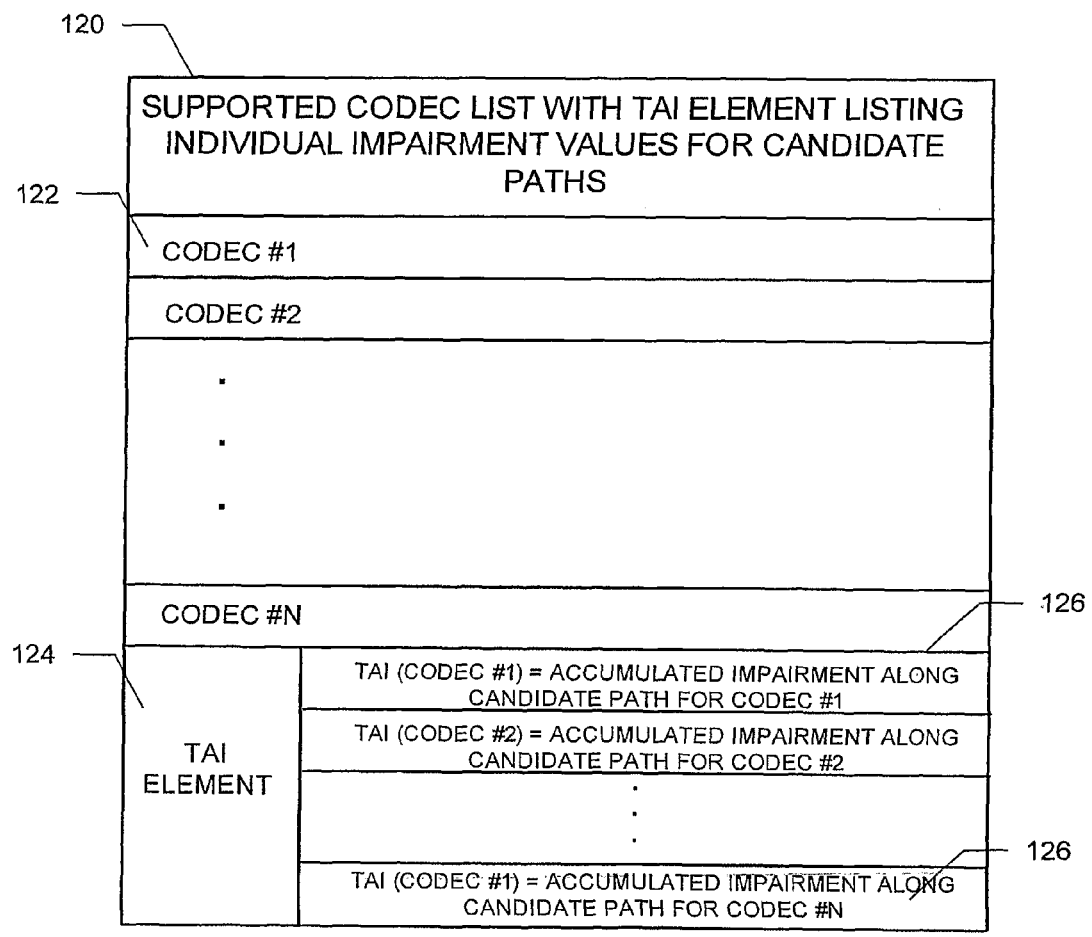
FIG. 9 illustrates the exemplary TAI information element of FIG. 8, which includes individual impairment values for each supported codec of the supported codec list.

Turning now to FIGS. 8 and 9, an information element 120 is contained within message 123 relayed between MSC server 102 MSC server 104, wherein information element 120 includes a supported codec list 122, as well as a total accumulated impairment (TAI) data element 124 listing individual impairment values 126 associated with candidate paths leading up to, and including, the supported codecs 122. More specifically, for each particular supported codec (or other element that may affect the connection quality) of a given stage, an individual TAI value is stored within the TAI element that represents the total expected impairment associated with the candidate path leading up to, and including, that particular codec of that particular stage. Hence, the TAI element includes the accumulated impairments for each of the listed supported codecs. That is, the TAI element is associated with a list of supported coding schemes, not with a list of particular transcoder devices. For the example of FIG. 6, message 123 sent from the originating stage to the intermediate stage thereby includes a list of the five codecs supported by the originating stage, as well as an indicator value for each of the five codecs supported by the originating stage. Each indicator value represents the expected accumulated impairment along the candidate path that leads up to, and includes, the corresponding supported codec. After the message is received by the intermediate stage, the intermediate stage will then change the indicator values to reflect the codecs supported by the intermediate stage. Preferably, the indicator 124 is sent only between control nodes (102-106) whereas the connection itself 113 is established between the payload nodes (108-112).

Returning to the example of FIG. 5, the TAI element of message 123 is first generated by the MSC 102 of the originating stage 115 based on the codecs that it supports and all knowledge it may have of the path 301 from the originating terminal up to MGW 108. The TAI element is then sent to the MSC 104 of the intermediate stage, which updates the TAI values based on the codecs its MGW 110 supports. Individual impairment values may be left unaltered or may be increased due to additional expected impairment. The TAI element is then sent to the MSC 106 of the terminating stage 119, which further updates the TAI values based on the codecs its MGW 112 supports and all knowledge it may have of the path 304 from MGW 111 up to the terminating terminal. Based on the information within the TAI element, the terminating MSC 106 selects a locally optimal combination of codecs for use in the path-segments 303 and 304 that will result in minimum impairment to the overall connection, i.e. that will degrade the quality of the connection the least. Note that MSC 106 must select the codec for path 303 from the list of codecs in the Supported Codec List it received from MSC 104. MSC 106 must select a codec from the list it received from the terminating terminal for path 304. Ideally, these codecs for paths 303 and 304 are identical and no transcoding is necessary. MSC 106 then relays the Selected Codec and the Alternative Codec List and the associated TAI elements back through MSCs 104, 102 of the various stages so that they can then select and activate the locally optimal codecs for use in their path-segments 302 and 301. In the best case, these locally optimal codecs are identical or at least compatible along the whole path in order to minimize or avoid transcoding stages, i.e. provide the global optimum.

Note that the information contained within data element 124 is not limited to providing an identification of the accumulated impairment due to the operation of a sequence of codecs along a candidate pathway, but can additionally (or in the alternative) reflect impairment due to radio impairment arising in connection with the candidate pathway as well, or acoustic impairments, or impairments due to digital signal processing, such as noise reduction, echo cancellation, level compensation, and the like. In the case of enhanced processing techniques such as noise reduction, echo cancellation and level cancellation the accumulated impairment may also decrease.

Preferably, the new TAI element 124 is inserted within the (existing) list of supported codecs of the message as if it were merely another supported codec within the list. Accordingly, any MSC that has not been configured to recognize and exploit the TAI element will simply delete the TAI element as if it were merely an unsupported codec. Those MSCs that are configured to recognize and exploit the TAI element will extract data from the element for use in updating the TAI element and/or determining the optimal sequence of codecs to be employed, i.e. to determine which codecs should be activated or deactivated from that portion of the connection that the particular MSC controls. In this manner, the TAI element is backward-compatible, i.e. it is compatible with any pre-existing network components that are not specifically configured to recognize and exploit the TAI element. Note that MSCs configured to recognize and exploit the TAI element can select a codec either via "external" selection or "internal" selection. By external selection, it is meant that the MSC merely selects a codec from the list of supported codecs for the incoming link. With internal selection, the MSC selects an additional, potentially different codec based on its own capability for generating a new TAI list with updated TAT values, which is subsequently forwarded to other MSCs on the outgoing link.

Figure 10:
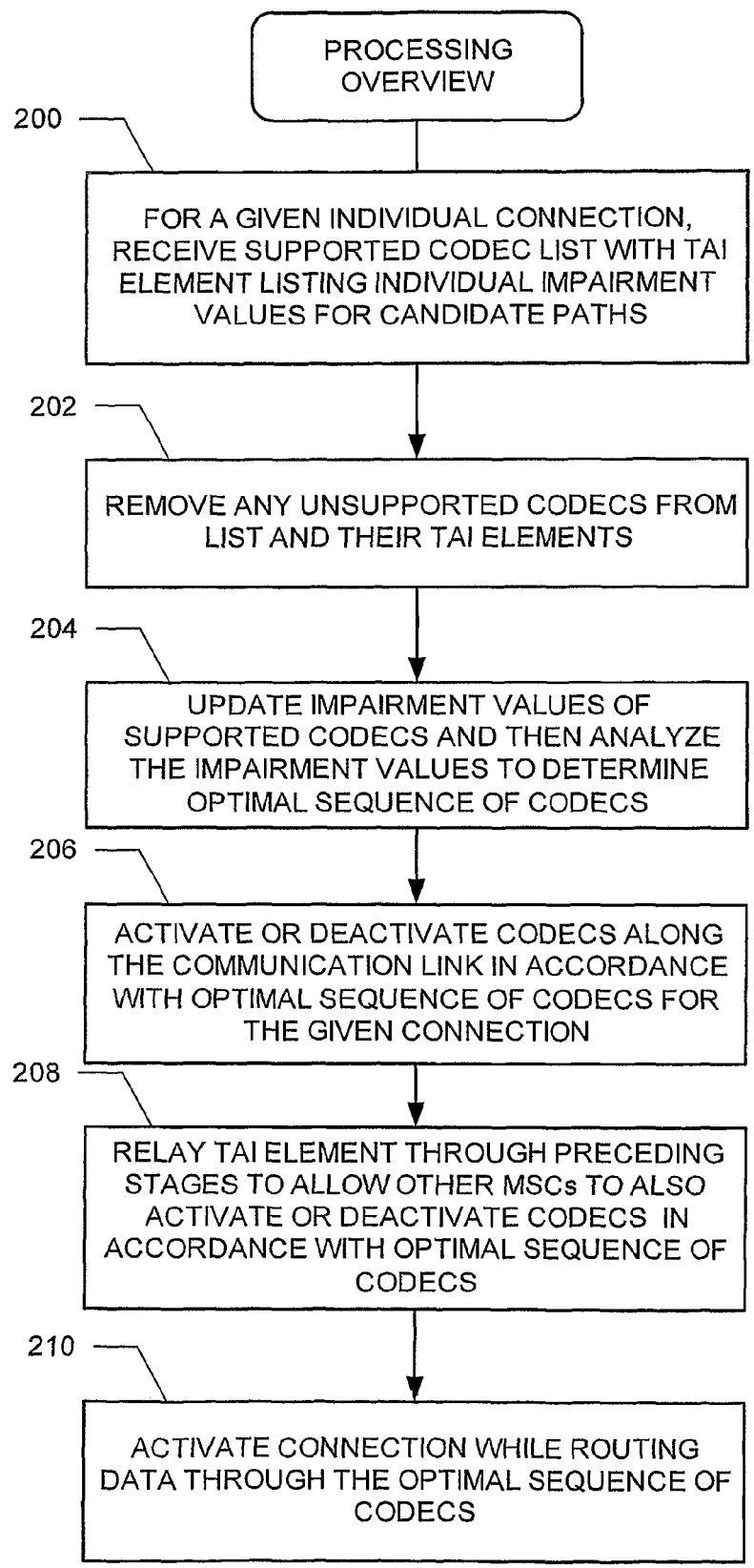
FIG. 10 provides an overview of a method for exploiting the TAI information element of the invention.

FIG. 10 summarizes the use of the TAI element in connection with specific attention to the terminating MSC. Briefly, beginning at step 200, for a given individual connection, such as a particular mobile call, the terminating MSC receives a supported codec list incorporating the TAI element listing the individual impairment values for the candidate paths, represented by these codec candidates. At a first step 202, any unsupported codecs are then removed from the list (state of the art). That is, any codes associated with codecs that are not supported by the particular portion of the connection that the terminating MSC controls are moved from the list. This is in accordance with otherwise conventional techniques. Together with the unsupported codec candidates, also their TAI values are eliminated. At step 204, the individual impairment values are updated to reflect additional impairments due to the codecs of the terminating stage (terminating MGW) and the terminating path to the terminal and are then analyzed to determine the optimal sequence of codecs from among the list of remaining supported codecs. Note: the terminating MSC has the power to select the codec for its incoming link and it can offer one or more codecs for the outgoing link.

At step 206, the terminating MSC activates or deactivates these two codecs from the communication link in accordance with the optimal sequence of codecs determined for that particular connection. In this regard, the terminating MSC sends appropriate control signals to one or more associated MGWs so as to control the MGWs to route the connection through the codecs that the terminating MSC has determined are optimal for that particular portion of the connection. At step 208, the MSC of the terminating stage relays the TAI element to the MSCs of the preceding stages to allow those MSCs to also select their codecs and to also instruct the MGWs associated with these MSCs to activate or deactivate the selected codecs in accordance with the optimal sequence of codecs.

Finally, at step 210, the originating MSC activates the connection. Data for the connection, such as encoded speech data, is routed through the optimal sequence of codecs. Note that the example of FIG. 10 is a simplified example providing an overview of just the operation of the MSCs, focusing on the terminating stage. In practice, the MSCs of each stage access and potentially modify each TAI element. This will be described in greater detail below with respect to various implementation examples involving originating, intermediate and terminating MSCs.

Preferably, the TAI indicator of the invention is also implemented in connection with TFO (see 3GPP TS 28.062) and TrFO (see 3GPP TS 23.153), which are technologies in 3GPP that aim to avoid speech quality impairments caused by unnecessary transcoding steps along the speech path. Both technologies exchange lists of codec-type candidates to allow the decision to be made as which codec type to use on which sub-link of the speech path. Further information may be found in 3GPP TR 23.977 (BARS). The "Codec Negotiation" can either be realized by "Inband Signalling" (for TFO, see TS 28.062), or by OoBTC (see 3GPP TS 23.153), or by the "SIP" (see SIP: (Internet Engineering Task Force) IETF standard) together with "SDP" (see also the IETF standard) and by a 3GPP variant of SIP, called INS ("IP Multimedia Sub-System"). However, principles of the invention may potentially be exploited in connection with other technologies as well. For the sake of simplicity, examples of the TAI element are primarily provided herein for use with OoBTC.

The values inserted within the TAI may be initially derived using the E-Model of ITU-T, but, as will be explained, radio interface values may be added and the values may be adjusted based on a particular operator's individual network layout. In particular, the E-Model (see G.107 and G.108) and other sources (see 3GPP TR 26.975) specify or allow to derive the intrinsic TAI values (impairment elements, also called "IE-Values" in the E-Model). "Intrinsic" means: "without any transmission errors". The "Impairment elements" (Ie) defined in the standard E-Model may also be modified in some cases to give the overall decision a certain "drift". At call setup, the originating call control node (e.g. the MSC-Server in the BICN in a mobile originating call) generates a list of Codec Types (i.e. a Supported Codec List) that are offered as alternatives for this call, see TS 23.153. This is otherwise conventional. In addition, though, the new TAI IE (IE=Information Element) is added as a "dummy Codec Type" entry in the Supported Codec List. This TAI IE holds new integer parameters (referred to herein as tai1, tai2, . . . ), with one for each entry of Codec Type IEs in the Supported Codec List. In one example, this new parameter ranges from 0 (=no impairment) to 100 or more (extreme impairment). For a practical implementation, a total range of 0 . . . 255 (one byte) is typically appropriate. Of course more than one byte could be reserved, e.g. a 16-bit word (0 . . . 65000) or other coding methods could be used in order to allow for an extended range.

The following is an example of a Supported Codec List with the new TAI Dummy Codec added. For the sake of simplicity in this description an example AMR Configuration is used, the so called "Preferred Configuration 1" (PC1), as is defined in TS 28.062, chapter 7.

PC1 for FR_AMR:=ACS=0x95, SCS=0x95, OM+MACS=0x04, also for UMTS_AMR2.
PC1 for HR_AMR:=ACS=0x15, SCS=0x15, OM+MACS=0x03.

The values (e.g. ACS=0x95) are in hexadecimal notation:

---

1. FR_AMR (PC1)
2. HR_AMR (PC1)
3. GSM_EFR
4. PCM A-LAW
5. UMTS_AMR2 (PC1)
6. TAI     (
              tai (Codec 1),
              tai (Codec 2),
              tai (Codec 3),
              tai (Codec 4),
              tai (Codec 5)
          )

---

As noted above, the TAI is not a selectable codec itself, but is a container for auxiliary information. Any node in that path that is not configured to recognize this "dummy codec" can delete it from the list, in which case nothing is gained for this call, but the call does not fail either (i.e. backward compatibility is achieved). According to the E-Model, some Codec Type entries get a low TAI value (good quality), some get a high one (worse quality). Initially, the E-Model values are used in the TAI. But these values can then be redefined for each network independently, if wanted, using, e.g., otherwise conventional adaptive techniques. The particular radio access is preferably taken into account as well, represented by an additional impairment added to the initial impairment values, depending on access type and local or temporal conditions. Terminal properties may also be included as an additional impairment value that represents, e.g. the acoustic properties, the estimated background noise conditions, the applied hands-free equipment and more.

The TAI element 124 (i.e. the "Supported Codec List plus TAI") is sent along the path and may be modified in each node. Impairments may either stay constant or may increase, but they do typically not decrease on the path. Some codec entries (e.g. entry "n") may be deleted. If so, then the corresponding tai(n) value is deleted as well. At the terminating call control node (e.g. the MSC-Server in a BICN for a terminating mobile call), the tai (j) value for each codec type entry j is taken into account, together with the terminating access, to select the optimal codec type for the terminating radio access and the core network link.

Exemplary TAI Data

Table 1 provides exemplary intrinsic TAI values for selected Speech Compression Algorithms.

TABLE 1

| Codec Type (in brackets: bit rate in kBit/s) | Intrinsic TAI value |
| --- | --- |
| PCM A-law (64.0) and PCM uLaw (64.0) | 1 |
| G.729 (8.0) | 10 |
| GSM_FR (13.0) | 20 |
| GSM_HR (5.6) | 23 |
| GSM_EFR (12.2) | 5 |
| FR_AMR(PC1) | 5 |
| HR_AMR(PC1) | 10 |
| AMR (12.2) | 5 |
| AMR (10.2) | 6 |
| AMR (7.95) | 9 |
| AMR (7.40) | 10 |
| AMR (6.70) | 13 |

TABLE 1-continued

| Codec Type (in brackets: bit rate in kBit/s) | Intrinsic TAI value |
|---|---|
| AMR (5.9) | 15 |
| AMR (5.15) | 19 |
| AMR (4.75) | 20 |

Table 2 provides exemplary TAI values for Radio Transmission Impairments, where the radio channel characteristics of the GMSK modulation in expressed as "carrier to interference (C/I) ratios". Individual values for C/I are represented in dB. The first value listed within each individual block of the third column is the radio impairment associated with the first value listed under transmission conditions of each individual block of the second column, and so forth. For example, within the first row, radio impairment value "0" is associated with transmission condition value ">13". Likewise, the second value listed in each block of the third column is associated with the second value of the corresponding block of the second column, and so forth. The exemplary "weighted average" of the fourth column takes a given average C/I distribution as its basis. This may vary between networks. The numbers in parenthesis in the is fourth column represent the intrinsic impairment of the best codec rate (in case of an adaptive Codec, such as AMR), which is added to the weighted average of the radio impairment.

TABLE 2

| Codec Type | Transmission conditions (GSM radio channel with C/I in dB) | Radio Impairment TAI values Individual per C/I | Weighted average |
|---|---|---|---|
| GSM_FR (13.0) | >13/13/10/7/4/1 | 0/1/8/18/40/90 | (20+) 7.9 |
| GSM_HR (5.60) | >13/13/10/7/4/1 | 0/1/8/18/40/90 | (23+) 7.9 |
| GSM_EFR (12.2) | >13/13/10/7/4/1 | 0/1/8/18/40/90 | (5+) 7.9 |
| FR_AMR (12.2) | >13/13/10/7/4/1 | 0/1/8/18/40/90 | (5+) 7.9 |
| FR_AMR (7.40) | >13/13/10/7/4/1 | 0/0/0/3/18/38 | (10+) 2.4 |
| FR_AMR (5.90) | >13/13/10/7/4/1 | 0/0/0/0/8/25 | (15+) 1.2 |
| FR_AMR (4.75) | >13/13/10/7/4/1 | 0/0/0/0/2/10 | (20+) 0.4 |
| FR_AMR (PC1) | With radio link adaptation selecting the optimal mode: | | (5+) 3.6 |
| HR_AMR (7.40) | >13/13/10/7/4/1 | 0/11/26/45/70/100 | (10+) 17 |
| HR_AMR (5.90) | >13/13/10/7/4/1 | 0/3/9/24/50/100 | (15+) 10 |
| HR_AMR (4.75) | >13/13/10/7/4/1 | 0/0/4/10/30/54 | (20+) 4.7 |
| HR_AMR (PC1) | With radio link adaptation selecting the optimal mode: | | (10+) 12.3 |

Note: Radio impairments as calculated above are a type of long-term-all-call-average, specific for this codec type on this radio link. It can be operator dependent, location dependent, time and date dependent, or load dependent. The long term average radio impairment for a "reasonable" GERAN design can be derived by assumptions/measurements on the C/I distribution and the consequent likelihood for these Codec Modes and the associated radio impairment for a mode at a given C/I. For exemplary results see Table 2. For practical applications, the values of Table 2 may be rounded to the next integer.

The TAI radio impairment values of Table 2 shall be added to the respective intrinsic impairment values of Table 1 to yield a value for entry within the TAI indicator. For example, the radio impairment value of Table 2 for GSM_EFR (12.2) is 7.9, and is added to the intrinsic impairment value for GSM_EFR (12.2) of Table 1 of 5, to yield the total value of 12.9 for entry into the TAI indicator for use with GSM_EFR (12.2) on an average GSM radio link. For another example, the weighted average radio impairment value for the FR_AMR (PC1) with link adaptation is 3.6, according to table 2, and this is added to the intrinsic impairment value of 5, according to table 1, for FR_AMR with the best mode in PC1, to yield the total value of 8.6 for entry into the TAI indicator for use with FR_AMR(PC1) on an average GSM radio link.

TAI Encoding Example

The TAI values for all entries on the Codec Lists can be concentrated within one "dummy" codec type IE, which can be defined in 3GPP TS 26.103 or ITU-T Q.765 or similar. The example here is given for TS 26.103. Various alternatives are possible, only one is given here in form of a 3GPP "Change Request". In one particular example, the Codec Identification (CoID) code is defined to be: TAI_CoID:=[0x1111.1110]. The TAI codec has n additional mandatory TAI parameters, when there are n Codec Type entries in the Codec List (excluding the TAI dummy codec itself). Each TAI parameter: eight bits. This Tai parameter defines the total accumulated impairment up to that node within the Codec Negotiation procedure for the one associated Codec Type entry. The lowest possible impairment value is 0 (=0x00), the highest possible impairment value is 255 (=0xFF). Interim results higher than 255 are mapped to 255, i.e. saturation is applied.

Table 3 provides a "Single Codec" information element that consists of 5+n mandatory octets in case of the TAI Dummy Codec, wherein "m" refers to mandatory octets for this example.

TABLE 3

| | Parameter | MSB 8 | 7 | 6 | 5 | 4 | 3 | 2 | 1 LSB |
|---|---|---|---|---|---|---|---|---|---|
| 1 m | Single Codec | Single Codec (see ITU-T Q.765.5) | | | | | | | |
| 2 m | Length Indication | 3 + n | | | | | | | |
| 3 m | Compat. Info | Compatibility Information | | | | | | | |
| 4 m | OID | ETSI OID (See ITU-T Q.765.5 [6]) | | | | | | | |
| 5 m | CoID | TAI_CoID | | | | | | | |
| 5 + 1 m | Tai 1 | Tai 1 | | | | | | | |
| ... m | ... | ... | | | | | | | |
| 5 + n m | Tai n | Tai n | | | | | | | |

The TAI Dummy Codec can be placed anywhere inside the Codec Lists.

Originating Node Example

In one particular example, the following procedures are employed for the TAI Dummy Codec IE in the Originating Node. The node that originates a Codec Negotiation (e.g. the O-MSC) first assembles the "real" (conventional) Supported Codec List. Then it adds the TAI dummy codec IE, preferably, but not necessarily, at the end of the list. Then it assigns Tai parameters to each real Codec entry in the list in the following step-by-step procedure:

1) For each real Codec Type entry the intrinsic TAI value is determined first. This can be done e.g. by table look up, because these intrinsic TAI values are predefined.

2) If a Codec Type is a "direct" code type, i.e. it can be used on the link from the originating terminal up to this node without using any transcoding stage in this node or in the MGW node controlled by this server node, then just the (radio) access error impairment for this Codec Type is added.

If the access is not via radio, but via ISDN/PSTN, then the impairment for PCM (=1) is added (it is assumed that ISDN/PSTN has no transmission errors).

3) If a Codec Type is an "indirect" codec type, i.e. it can not be used in the originating terminal, but only be used with transcoding in this originating node or in the MGW node controlled by this server node, then the access impairment is added to the intrinsic impairment of this Codec Type.

If the access is conventional ISDN/PSTN, then just the PCM impairment is added. In this case the FR_AMR (PC1) gets 1+5=6.

If the originating access is, however, a radio link (without TFO), then the impairment of this radio link is added, plus the one for the PCM in between. Example: the originating terminal uses the GSM_FR, with intrinsic impairment 20 and GSM radio impairment 7.9, together 27.9, but the O-MSC can only offer FR_AMR(PC1) in the Supported Codec List. Then the TAI value of FR_AMR(PC1) is 5 plus 27.9. To be exact also the impairment of PCM Alaw (=1) needs to be taken into account, because in practise the transcoding from GSM_FR to FR_AMR is done via PCM.

So the total accumulated impairment for FR_AMR (PC1) in the O-MSC in this example is already 20+7.9+1+5=33.9.

If the Codec List contains several direct codec types, then the minimal impairment of all these direct codec types is added to the intrinsic impairments of all indirect codec types. By this method the number of candidate paths is reduced to a practical size, assuming that the best direct codec (the one with minimal impairment) would be selected at the end.

Note: this handling to reduce the size of the outgoing Supported Codec List is similar to the handling in an intermediate node, see below.

4) If the originating MSC server has additional information on terminal type, accessory type or other information, then additional impairments may be added, depending on that additional information.

When the final SCL+TAI is sent forward, then each real codec entry has an associated TAI value, which represents all impairments of the connection up to that point in the speech path for the case that this specific codec would be selected.

The following example table shows a Supported Codec List for GERAN access with three direct Codec candidates (FR_AMR, HR_AMR, GSM_EFR) and two indirect Codec candidates (PCM and UMTS_AMR).

1. FR_AMR (PC1)
2. HR_AMR (PC1)
3. GSM_EFR

-continued

4. PCM A-LAW
5. UMTS_AMR (PC7)
6. TAI    (    tai(FR_AMR (PC1) )        = 8.6,
               tai(HR_AMR (PC1) )        = 22.3,
               tai(GSM_EFR)              = 12.9,
               tai(PCM)                  = 9.6,
               tai(UMTS_AMR (PC7) )      = 14.6.
          )

In the forgoing the simplified notation, "UMTS_AMR (PC7)" stands for "preferred configuration 7" and includes only mode 12.2 and is used as an abbreviation for UMTS_AMR (ACS=80, SCS=80, OM+MACS=01).

A direct Codec is FR_AMR (PC1) for GERAN with TFO supported in GERAN and the connected MGW. The intrinsic quality impairment for this is Tai(intrinsic(FR_AMR (PC1)))=5, i.e. the one of the best possible mode (AMR12.2). The average radio impairment is 3.6 (see table 2). The final Tai value for FR_AMR (PC1) for O-MSC is: Tai(FR_AMR (PC1))=Tai(intrinsic(FR_AMR(PC1)))+Tai(radio (FR_AMR(PC1)))=8.6. For the second direct Codec Type, HR_AMR (PC1) the TAI is calculated as 10+12.3=22.3. For the third direct Codec Type, GSM_EFR, the TAI is calculated as 5+7.9=12.9.

The TAI value for the PCM Codec Type is calculated as 1 (its intrinsic impairment) plus the minimum TAI of all three direct Codec Types, which is 8.6 in this example. So PCM gets a TAI value of 9.6.

The TAI value for the UMTS_AMR(PC7), which is the second indirect codec type here, is 5 (its own intrinsic impairment)+1 (for PCM)+8.6=14.6

In another example with GSM_FR on the radio access the SCL may be:

1. PCM
2. FR_AMR (PC1)
3. TAI    (    tai(PCM) = 20+7.9+1 = 28.9,
               tai(FR_AMR(1) 20+7.9+1+5 = 33.9.)
          )

This other GSM originating mobile supports only GSM_FR. TFO and TrFO for this are not supported and so PCM must be used on the A-Interface. The first Codec in the Supported Codec List is therefore PCM A-law and is an indirect Codec Type. The intrinsic Tai value for PCM is 1. But here a specific GSM radio access is in addition to be included, with Tai(intrinsic(GSM_FR))=20. Further, the radio impairment for an average GSM_FR channel is considered as well (not detailed here), see Table 2. The final tai value for this PCM under the GSM access condition is: Tai(PCM)=1+20+Tai(radio(GSM_FR))=28.9.

The FR_AMR(PC1) is also only an indirect codec candidate. It's TAI can only come "on top" of Tai(PCM) as calculated above. This FR_AMR(PC1) can be used in the BICN without additional radio impairment. So Tai(FR_AMR (PC1)) with that GSM_FR radio access yields Tai(FR_AMR (1))=Tai(PCM)+5=33.9.

In another example: the mobile is identified via its international mobile equipment identity (IMEI) as one with bad acoustic design and for example 6 impairment points are added to all Tai values for all Codec Type entries in the SCL. The Tai(FR_AMR(PC1)) of example 2 is then increased to 39.9.

Intermediate Node Example

The following procedures may be used for the TAI Dummy Codec in an Intermediate Node, Typically an intermediate node (I-MSC) checks the incoming Supported Codec List, removes entries, which are not known to it or which are not supported by its MGW-candidates and sends the modified list forward. A "legacy" MSC-Server therefore simply deletes the TAI entry from the list. A TAI-capable intermediate node (e.g. I-MSC) sends the TAI entry forward, but potentially modified. The Tai values associated to deleted codec entries shall be deleted as well. The other Tai values are left unmodified, unless transcoding stages or other processing of the User Plane (inside the I-MGW) are to be considered.

The following example shows the same incoming SCL+TAI as above, after the removal of GSM_EFR in a TAI-capable node.

```
1. FR_AMR (PC1)
2. HR_AMR (PC1)
3. PCM A-LAW
4. UMTS_AMR (PC7)
5. TAI   (          tai(FR_AMR (PC1) ),
                    tai(HR_AMR (PC1) ),
                    tai(PCM),
                    tai(UMTS_AMR (PC7) )
         ).
```

The next example shows the same incoming SCL+TAI as above, after the removal of GSM_EFR and the removal of TAI in a legacy intermediate node.

1. FR_AMR (PC1)
2. HR_AMR (PC1)
3. PCM A-LAW
4. UMTS_AMR (PC7).

Note that "legacy" MSC-Servers, at this stage, delete the TAI IE completely, because they do not recognize it.

If the intermediate node needs to apply or foresee transcoding for whatever reasons, or has to select a codec, e.g. due to supplementary services, or has to consider other user plane processing, e.g. a Conference Device, and wants to start a new Codec Negotiation for the remaining path, then the following possibilities may be exploited:

Case A) The node selects a Codec for the incoming path from the incoming SCL after removing all Codec entries that it does not support. It can, e.g., select the Codec with the smallest Tai value (if voice quality is to be optimized), or another Codec Type (if other criteria is to be optimized).

If we take the example of above, with GSM_EFR removed, but the TAI values preserved, then FR_AMR(PC1) should be selected for optimal voice quality.

After that selection, the node designs the new, outgoing SCL+Tai, with or without all or some codecs copied from the incoming SCL. The Tai values for the outgoing SCL shall then take the Tai value of the already Selected Codec into account. If this already Selected Codec is again included in the outgoing SCL, and no signal processing is inserted in this I-MGW, then its Tai value is also copied unmodified.

All other codec entries in the outgoing SCL get their own intrinsic Tai value added to the Tai value of the Selected Codec.

In the same above example the outgoing SCL+TAI would be:

1. FR_AMR (PC1)
2. HR_AMR (PC1)
3. PCM A-LAW
4. UMTS_AMR (PC7)
5. TAI   (          tai(FR_AMR (PC1) )         = 8.6,
                    tai(HR_AMR (PC1) )         = 19.6
                    tai(PCM)                   = 9.6,
                    tai(UMTS_AMR2 (PC7) )      = 14.6
         )

If, however, a signal processing is inserted in this I-MGW, such as a conference device, echo canceller, or other, which needs decoding and re-encoding, then the impairment of this signal processing has to be added to the TAI value of the already pre-selected codec. All codec candidates of the outgoing SCL get their individual intrinsic impairment plus the TAI of the pre-selected codec plus the impairment due to that signal processing.

In the same above example, with an example signal processing impairment of 4, the outgoing SCL+TAI would be:

1. FR_AMR (PC1)
2. HR_AMR (PC1)
3. PCM A-LAW
4. UMTS_AMR (PC7)
5. TAI   (   tai(FR_AMR (PC1) )      8.6+4+5    = 17.6,
             tai(HR_AMR (PC1) )      8.6+4+10   = 22.6,
             tai(PCM)                8.6+4+1    = 9.6,
             tai(UMTS_AMR2 (PC7) )   8.6+4+5    = 17.6
         )

Case B) The node does not select a codec at this point, but waits for the result of the second codec selection coming back. This is, for example, important for BICC-SIP interworking. The outgoing SCL is then constructed, with or without all or some codecs copied from the incoming SCL. The Tai values for the outgoing SCL then take the Tai value for the most likely codec on the incoming link into account. This can be the codec with lowest Tai value so far (optimizing for best quality) or another Codec (e.g. if optimizing for other criteria). Codec Types that are directly copied from the incoming SCL to the outgoing SCL keep their Tai value unmodified. All other codec entries in the outgoing SCL get their own intrinsic Tai value added to the Tai value of the most likely codec of the incoming link.

In the same above example the outgoing SCL+TAI for a SIP Invite, including the G.729 would be:

1. AMR (PC1)
2. G.729
3. PCM A-LAW
4. AMR (PC7)
5. TAI   (   tai(AMR (PC1) )    8.6 + 0     = 8.6,
             tai(G.729)         8.6 + 10    = 18.6
             tai(PCM)           8.6 + 1     = 9.6,
             tai(AMR (PC7) )    8.6 + 5     = 13.6
         )

This calculation assumes this time that transcoding can be done within the MGW between the AMR and any other Codec without the intermediate step of PCM Alaw. Note that SIP invite does not differentiate between FR_AMR and UMTS_AMR, but only simply offers AMR.

If the intermediate node needs to consider further user plane modifications in the connected MGW, then the impairments of these user plane modifications can be added as well to all outgoing tai values.

In the same above example the outgoing SCL+TAI for a SIP Invite, including the G.729 and a signal processing impairment of 4 would be:

1. AMR (PC1)
2. G.729
3. PCM A-LAW
4. AMR (PC7)
5. TAI   (          tai(AMR (PC1) )        8.6 + 4 + 5      = 17.6,
                    tai(G.729)     8.6 + 4 + 10             = 22.6
                    tai(PCM)               8.6 + 4 + 1      = 13.6,
                    tai(AMR (PC7) )        8.6 + 4 + 5      = 17.6
        )

When, at a later point in time, the result of the second Codec Negotiation gets reported back, i.e. when the Selected Codec for the outgoing path is known, then the intermediate node performs Codec Selection for the first, incoming call leg, taking both, the second Selected Codec and its Tai value and the Tai values of the incoming SCL into account.

Terminating Node Example

The following procedures may be implemented for the TAI Dummy Codec in a Terminating Node. The terminating node (e.g. a t-MSC Server) first removes all Codec Types from the incoming I-SCL+Tai that it does not support.

If the terminating node is not TAI-capable, then it removes the Tai codec from the I-SCL and the decision is otherwise conventional and all considerations end here.

If the terminating node is TAI-capable, then it interrogates the terminating access and builds the terminating T-SCL+Tai. The rules for that are identical to the rules for an originating O-SCL+Tai (see above).

If the Tai values are missing in the I-SCL, then some default Tai values are used.

The terminating node then calculates for all possible n*k codec combinations, i.e. for all n codecs in the incoming I-SCL+Tai and k codecs in the terminating T-SCL+Tai, the total, end-to-end "e2e-Tai" values.

If the optimization criteria is voice quality, then the codec combination with the lowest e2e-Tai value is selected. If the optimisation criteria is different, then the calculated total e2e-Tai values are used to exclude all combinations that exceed a certain maximum Tai threshold and then a selection is made among the remaining candidates.

This selection process in the terminating node defines two codecs:
the codec for the terminating access ("Terminating Codec") and
the codec for the incoming path (typically the codec in the core network).

This is also called a "Selected Codec" in the TrFO standard (TS 23.153).

Ideally both, the Terminating Codec and the Selected Codec, are identical.

This Selected Codec is then sent backward. A Tai value is calculated and assigned, considering the Terminating Codec and this Selected Codec. This Tai value is calculated now "backward", i.e. without considering the incoming path from the originating access to this terminating point, but this time the path is backwards from the terminating terminal. This is to allow the intermediate nodes and finally the originating node to select the optimal codec for their call segments (ideally this is the Selected Codec again).

In addition, the terminating node constructs the "Available Codec List" (ACL) that is sent backward for future modifications of the call. Also this ACL has the Tai values associated, calculated "backward", i.e. exactly the same way as if the ACL would be the originating SCL of a call setup in the opposite direction, with one exception: Codecs that were not included in the incoming I-SCL are already now excluded from the ACL.

After call setup the originating node has an exact end-to-end TAI value of the establish call path, because in the backward path all final Tai values have been considered correctly after the selections have been done. The ACL+Tai, which is available at the originating node, gives a good overview about the other optional codec candidates and their associated Tai values. The originating node also knows the Selected Codec in the neighbouring CN-segment and the Originating Codec, i.e. the codec finally selected on the originating access.

The terminating MSC has similar information derived from the incoming SCL+Tai and its own selection process. It does not exactly know what the final decisions were in the backward process, but with high likelihood the Tai-estimate is good enough. The terminating node knows exactly the Selected Codec in the neighbouring CN-segment and the Terminating Codec.

In an alternative approach, which differs from the TrFO standard, the originating MSC sends a kind of ACL again in forward direction, this time with exactly calculated TAI values, as the Originating Codec and all Selected Codecs are now exactly known, in order to allow all nodes in the path and especially the terminating node to have an exact knowledge about the accumulated impairments of the established path.

Ideally these determined Codecs are all identical, though such is not necessary. In most cases the Selected Codecs are identical/compatible in all CN-segments and identical/compatible to either the Originating Codec or the Terminating Codec. In some cases different Selected Codecs might be selected along the path through the CN, but in most cases the Access Codecs (Originating Codec and Terminating Codec) are then compatible to their next Selected Codecs in their neighbouring CN segments.

Handover Example

The following procedures for the TAI Dummy Codec in Handover Situations may be implemented. When, at the originating side, a handover needs to be performed, then the originating node interrogates the target radio access and determines the target X-SCL+Tai, exactly as the O-SCL+TAI or the T-SCL+TAI are determined. It then performs a similar codec selection process as the terminating node has done for call setup, considering the previously received ACL+Tai and this new X-SCL+Tai. Typically, the thus far Selected Codec should be in the best combination and only a new Originating Target Codec needs to be determined. In most cases the new Originating Codec will be identical/compatible to the old Originating Codec. In that case the handover can be performed without influence on the CN and the remaining call path. Similar procedures are used for handovers at the terminating side as well as for other Mid-call Modifications.

What have been described are various techniques for implementing and deploying a TAI element. With this additional TAI information, the codec selection is substantially improved compared to conventional techniques. The balance between speech quality and e.g. bit rate saving can be tuned to be much more precise, i.e. in some cases additional transcoding is possible (so as to save transmission effort), while in other cases PCM is to be used. With conventional techniques, this decision is always based on "thin" assumptions.

The techniques of the invention are flexible and can be applied to any kind of impairment in the communication path. As noted, the techniques of the invention are also backward compatible. Moreover, the techniques of the invention may be exploited on, and between, telecom protocols supporting codec negotiation (TFO, BICC, SIP, other). It can be exploited in ISUP as well. Hence, wireless or other network operators can improve Voice Quality even under complex call scenarios and can equalize and optimize the voice quality together with other side-conditions that allow network operation at substantially reduced operational costs (lower bit rate, lower transcoding costs). The end customer perceives a better voice quality. The equipment vendor can exploit much better decision criteria and the various call cases can be handled in a more harmonized and therefore overall simpler way.

Thus, to summarize what has been described, in one example, a method is provided for controlling the establishment or modification of a connection in a communication network (100) comprising a plurality of nodes (102-112), wherein a connection (113) is to be established or modified between selected nodes (108-112). At least one of the nodes (102-106) is adapted to employ one or more coding schemes along the connection (113). The coding schemes are selected from a plurality of supported coding schemes (122) potentially affecting connection quality by individual amounts, and wherein an indicator (124) is sent between the nodes that includes information pertaining to connection quality. The indicator (124) includes a plurality of individual values (126) corresponding to individual coding schemes, each value (126) indicating an expected accumulated impairment associated with a corresponding supported coding scheme (122).

In another example, a node (102-112) is provided for controlling the establishment or modification of a connection in a communication network (100) comprising a plurality of nodes (102-112), wherein the node (102-112) has an interface to at least one other node (102-112). The node (102-112) is adapted to establish or modify at least a portion of the connection (113) and to employ one or more coding schemes along the connection (113). The coding scheme is selected from a plurality of supported coding schemes (122) potentially affecting connection quality by individual amounts. The node (102, 112) is operative to control establishment of a portion of the connection (113) based in part on an indicator (124) received in a control message (119). The indicator (124) includes information pertaining to connection quality. The indicator (124) includes a plurality of individual values (126) corresponding to individual coding schemes, each value (126) indicating an expected accumulated impairment associated with a corresponding supported coding scheme (122).

Although described primarily with respect to speech codecs, the invention is applicable to other entities that can affect service quality, such as video codecs/video transcoders, rich media adaptors/transcoders, rich media filters, conference devices, echo suppressors, noise reduction devices, etc. In particular, the invention is applicable to multimedia transmissions involving video codecs, where the TAI values represent video impairment. In these application cases TAI-values should be presented for each media (Speech, Video, other) separately.

While the invention has been described with respect to particular embodiments, those skilled in the art will recognize that the invention is not limited to the specific embodiments described and illustrated herein. Therefore, it is to be understood that this disclosure is only illustrative. Accordingly, it is intended that the invention be limited only by the scope of the claims appended hereto.

The invention claimed is:

1. A method for controlling an establishment or modification of a connection in a communication network comprising a plurality of nodes subdivided into a core network and an access network, the connection comprising a plurality of connection stages, each connection stage controlled by one or more nodes, the method comprising the steps of:
modifying or establishing at least a portion of the connection between selected nodes, one of the selected nodes being configured to employ one or more coding schemes along the connection, the coding schemes being selected from a plurality of supported coding schemes potentially affecting connection quality by individual amounts, and
sending an indicator between the selected nodes including a node in the core network that includes information pertaining to the connection quality, wherein the indicator includes a plurality of individual values, each individual value corresponding to one of the supported coding schemes employed by one of the selected nodes and indicating an expected accumulated impairment associated with employing the one of the supported coding schemes at the one of the selected nodes, wherein a plurality of candidate paths with respect to individual concatenations of supported coding schemes lead through any preceding connection stages to a current connection stage.

2. The method according to claim 1, wherein each individual value of the indicator indicates the accumulated impairment associated with a corresponding supported coding scheme of the current connection stage and an impairment of any supported coding schemes along one particular candidate path chosen among the candidate paths leading to the current connection stage.

3. The method according to claim 2, wherein the particular candidate path is a path of least impairment.

4. The method according to claim 1, wherein the accumulated impairment includes an impairment due to processing performed by transcoders associated with the one of the supported coding schemes.

5. The method according to claim 1, wherein the accumulated impairment includes an impairment due to a radio impairment.

6. The method according to claim 1, the communication network comprising control nodes and payload nodes which are controlled by the control nodes, wherein the method further comprises the step of sending the indicator between the control nodes, between the payload nodes, or between the payload nodes and the control nodes, and establishing the connection between the payload nodes.

7. The method according to claim 1, further comprising the step of configuring each connection stage of the connection to update the individual values of the indicator based on the supported coding schemes of a corresponding connection stage.

8. The method according to claim 1, wherein the indicator is initially forwarded from an originating connection stage to a terminating connection stage.

9. The method according to claim 8, wherein the terminating connection stage or any intermediate connection stage executes the steps of:
updating the individual values of the indicator based on impairments due to supported coding schemes of a corresponding connection stage, and
selecting a path for use with the connection based on updated individual values of the indicator.

10. The method according to claim 9, wherein the updated individual values of the indicator or a message derived therefrom is returned through any intermediate connection stages to the originating connection stage.

11. The method according to claim 10, wherein more precise accumulated impairments are calculated step by step in a backward direction by the intermediate connection stages and the originating connection stage according to a finally selected terminating access and a finally selected candidate path and are passed on from connection stage to connection stage such that, within the originating connection stage, a total accumulated impairment of the finally selected candidate path is more precisely known.

12. The method according to claim 11, wherein the originating connection stage after all selections have been made sends the indicator with the more precise accumulated impairments in a forward direction through any intermediate connection stages to the terminating connection stage.

13. The method according to claim 9, wherein a selected node of the originating connection stage and selected nodes of any intermediate connection stages employ the supported coding schemes in accordance with a selected path.

14. The method according to claim 1, wherein the connection is a speech, video or multimedia connection.

15. The method according to claim 1, wherein the selected nodes are configured to send messages containing a list of the supported coding schemes and wherein the individual values of the indicator are sent as a dummy entry in the list.

16. A control node for controlling an establishment or modification of a connection in a communication network comprising a plurality of nodes subdivided into a core network and an access network, the connection comprising a plurality of connection stages, each connection stage controlled by one or more nodes, the control node comprising:

an interface to at least one other node and wherein the control node is configured to establish or modify at least a portion of the connection and to employ one or more coding schemes along the connection, wherein the coding schemes are selected from a plurality of supported coding schemes potentially affecting connection quality by individual amounts, the control node being operative to control establishment of a portion of the connection based in part on an indicator received in a control message, the indicator including information pertaining to the connection quality with a node in the core network, wherein the indicator includes a plurality of individual values, each individual value corresponding to one of the supported coding schemes employed by the node and indicating an expected accumulated impairment associated with employing the one of the supported coding schemes at the node, wherein a plurality of candidate paths with respect to individual concatenations of supported coding schemes lead through any preceding connection stages to a current connection stage.

17. The control node according to claim 16, wherein each individual value of the indicator indicates the accumulated impairment associated with a corresponding supported coding scheme of the current connection stage and an impairment of any supported coding schemes along one particular candidate path chosen among the candidate paths leading to the current connection stage.

18. The control node according to claim 17, wherein the particular candidate path is a path of least impairment.

19. The control node according to claim 16, wherein the accumulated impairment includes an impairment due to processing performed by transcoders associated with the one of the supported coding schemes.

20. The control node according to claim 16, wherein the accumulated impairment includes an impairment due to a radio impairment.

21. The control node according to claim 16, wherein the indicator is sent between control nodes, between payload nodes, or between the payload and the control nodes, and the connection is established between the payload nodes.

22. The control node according to claim 16, wherein each connection stage of the connection is configured to update the individual values of the indicator based on the supported coding schemes of a corresponding connection stage.

23. The control node according to claim 16, wherein the indicator is initially forwarded from an originating connection stage to a terminating connection stage.

* * * * *